United States Patent
Raves

[11] 3,720,070
[45] March 13, 1973

[54] APPARATUS AND METHOD FOR PLOWING CABLE OR PIPE

[75] Inventor: John Reginald Raves, Dollard des Ormeaux, Quebec, Canada

[73] Assignee: Northern Electric Company Limited, Montreal, Quebec, Calif.

[22] Filed: July 7, 1971

[21] Appl. No.: 160,417

[52] U.S. Cl. .................... 61/72.6, 226/25, 226/42, 242/45, 242/75.3
[51] Int. Cl. .................... F16l 11/00, B65h 23/20
[58] Field of Search ............ 61/72.6, 72.1, 72.3, 72.5, 61/72.6, ; 226/25, 42; 242/75.3, 45

[56] References Cited

UNITED STATES PATENTS

| | | |
|---|---|---|
| 3,400,542 | 9/1968 | Davis .................... 61/72.6 |
| 2,227,356 | 12/1940 | Lawson .................... 226/42 |
| 3,083,887 | 4/1963 | Huck .................... 242/75.3 X |
| 3,289,959 | 12/1966 | Scher .................... 242/45 |
| 3,343,739 | 9/1967 | Kinnan .................... 61/72.6 X |

*Primary Examiner*—Jacob Shapiro
*Attorney*—John E. Mowle

[57] ABSTRACT

An apparatus for regulating the pay out tension of a cable passing from a cable reel into the cable chute of a cable plow. The tension in the cable deflects a cable guide which supports the cable as it passes from the cable reel into the cable chute. This deflection of the cable guide adjusts the flow of hydraulic fluid through an associated valve so as to vary the drive to a hydraulic motor which rotationally drives the cable reel.

2 Claims, 2 Drawing Figures

APPARATUS AND METHOD FOR PLOWING CABLE OR PIPE

FIELD OF THE INVENTION

This invention relates to pipe or cable plows and more particularly to an apparatus for, and a method of, controlling pay out tension of pipe or cable from a reel during a plowing operation.

DESCRIPTION OF THE PRIOR ART

It has been common to plow pipe or cable into the ground with a specially designed plow in order to take advantage of the ease and economy resulting from this method. As under most circumstances the operation of plowing of pipe and cable are quite similar, for convenience, the plowing operation will refer to the plowing of cable only and it will be understood that the described apparatus and method relating to the invention is applicable to electrical cable, flexible pipe or other flexible elongated members. During the usual plowing operation cable is payed out from the cable reel by tensioning the cable to rotate the cable reel. The cable reel may be provided with a drag brake to supply a suitable braking drag, as required, or the cable may be mounted on a smaller spindle than required by its central supporting hole to restrict the pay off of cable from the reel. It is common to pay off the cable from the cable reel by looping the cable one or more times over a rotating capstan prior to passing the cable through the cable chute of a cable plow. When the tension in the plowed cable increases due to a demand for more cable this increased tension is transmitted along the cable to tighten the cable looped over the rotating capstan. As the cable loop tightens over the rotating capstan the increased cable contact with the capstan enables the capstan to draw more cable from the cable reel. In the aforementioned arrangement and in many other arrangements the cable reel is rotated by tensioning the cable and not by means of a driving force applied directly to the cable reel.

SUMMARY OF THE INVENTION

It has been found that certain types of cable, particularly coaxial cable, are more susceptible to damage by tension during the plowing operation than the common multiconductor cable usually used as telephone cable. To limit the pay out tension of the cable from the cable reel it is proposed to drive the cable reel directly, such as axially or along its rim, in order not to rely on tension in the cable to rotate the cable reel. In order that the pay out tension of the cable from the cable reel may be regulated to some preferred value, the tension of the portion of the cable passing from the cable reel into the cable chute of the cable plow is monitored and is used to control the drive to the cable reel. When the tension in the cable increases beyond a predetermined value the drive to the cable reel increases so as to increase the rate of pay out of cable from the cable reel and thereby reduce the cable tension. Conversely, a decrease in cable tension will reduce the drive to the cable reel so as to increase the cable tension.

Thus, in accordance with the present invention, the apparatus for plowing elongated flexible members such as pipe or cable under controlled tension comprises a means for supporting and rotatively driving a cable reel to pay out the cable. A cable supporting guide is used to support the cable payed out of the cable reel and to guide the cable into a cable chute of a cable plow. In response to the tension on the cable between the cable reel and the cable chute a means is provided for controlling the rotational drive, and thus the rotational speed, of the cable reel in order to regulate the tension in the cable.

The invention also encompasses a method, of plowing into the ground elongated members such as pipe or cable under controlled tension. In its operation the method comprises uncoiling a cable from a cable reel by rotatively driving the cable reel to pay out the cable. The cable being payed out from the cable reel is supported by a cable guide, and guided by said guide into a cable chute of a cable plow. The drive to the cable reel is controlled, in response to the tension of the cable between the cable reel and the cable chute, in order to control the rotational speed of the cable reel and thereby maintain said tension at a predetermined value.

BRIEF DESCRIPTION OF THE DRAWINGS

An example embodiment of the invention will now be described with reference to the following drawings in which:

Referring to FIG. 1 the apparatus for plowing cable 14 under controlled tension comprises a cable reel 10 which is axially driven by means of a hydraulic motor 12. Hydraulic lines 13 supply hydraulic fluid under pressure from a pump source 15 to the hydraulic motor 12 through a fluid valve or hydraulic control valve 18. A cable 14 which is payed out from the cable reel 10 is supported and guided by a cable guide 16 into a cable chute 20 of a cable plow 22. Only the necessary parts of the cable plow 22 is illustrated in FIG. 1, that is only the plowshare 21 and the cable chute 20. The supporting structure for the cable plow 22 is not shown as it is not necessary to the understanding of the invention. For the same reason, the supporting structures of the cable reel 10 and the cable guide 16 are not shown in FIG. 1.

Figure 2:
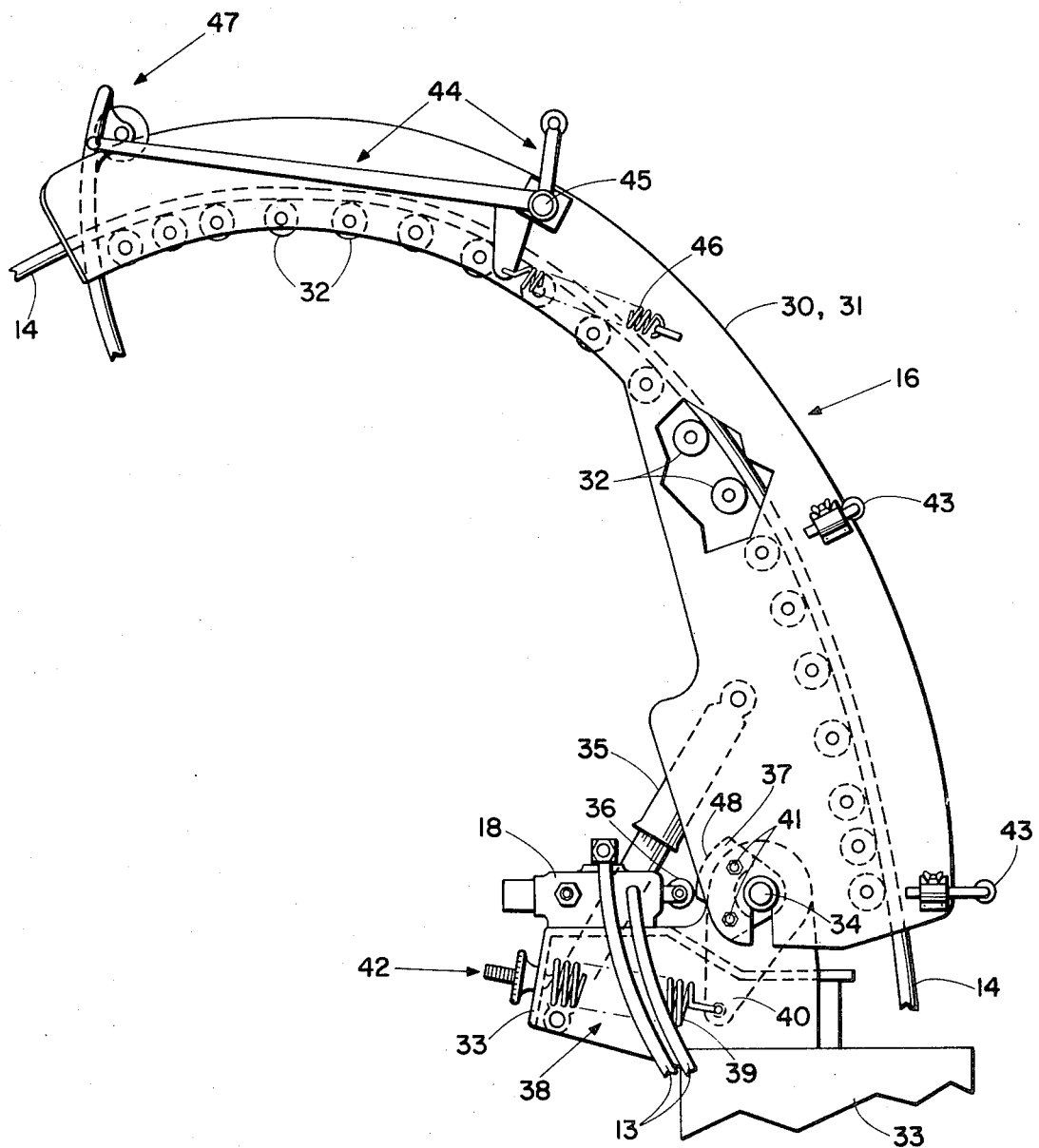
FIG. 2 is a side view of a cable guide in accordance with the present invention.

A more detailed view of the cable guide 16 can be seen in FIG. 2. The cable guide 16 comprises a pair of curved parallel metal side frames 30, 31 which are provided with a plurality of rollers 32 arranged to define a smooth arcuate path for the cable 14. The cable guide 16 is pivotly mounted to a support frame 33 with a pivot bolt 34. A double acting shock absorber 35 is fastened to the metal side frame 30 and to the supporting frame 33 to dampen the swing of the cable guide 16 about the pivot bolt 34. A hydraulic control valve 18 is mounted on the supporting frame 33 such that its valve actuating roller 36 may contact a cam 37 which is fixed to the side frame 31. An adjustable swing tension control 38 is provided by means of a coil spring 39, which is fastened at one end to an arm 40 projecting from side frame 31. The arm 40 and the cam 37 are fixed to the side frame 31 by means of bolts 41. The other end of the coil spring 39 is connected to the support frame 33 by means of a threaded bolt and knob combination 42. By adjusting the threaded bolt and knob combination 42 the tension of the coil spring 39 may be varied such that the force required to pivot the cable guide 16 about pivot bolt 34 may be set to any required value.

In order to keep the cable 14 in contact with the rollers 32 of the cable guide 16, adjustable U-shaped guide forks 43 are fastened to the side frames 30 and 31 of the cable guide 16. In addition a guide fork assembly 44 is pivotely fastened to the side frames 30 and 31 with guide fork pivot bolts 45. The guide fork assembly 44 is spring loaded with fork springs 46 to urge a U-shaped member 47 forming part of the guide fork assembly 44 downwards onto the cable 14.

When the cable 14 is being plowed the cable 14 is passed over the cable guide 16 so as to be supported by the rollers 32. When coaxial cable is being plowed or when other cables which are susceptible to damage due to excessive flexing are being plowed, the cable reel 10 is usually positioned behind the cable chute 20 of the cable plow 22 such that the cable will not undergo any significant curvature reversal as it passes from the cable reel 10 into the cable chute 20 of the cable plow 22. The adjustable U-shaped guide forks 43 are adjusted according to the diameter and type of the cable. The threading bolt and knob combination 42 is adjusted in accordance to the weight of the cable 14 and to the degree of tension desired in the portion of the cable 14 passing over the cable guide 16. If the tension in the coil spring 39 is increased by adjusting the threaded bolt and knob combination 42, the tension in the cable 14 during the plowing operation will increase as a greater force will be required to deflect the cable guide 16 downward. By downward deflection it is meant that the cable guide as illustrated in FIG. 2 will rotate in a counter clockwise manner about pivot bolt 34. The cam 37 which is fixed to the side frame 31 of the cable guide 16 has a contoured surface 48 which is in contact with the valve actuating roller 36. The contoured surface 48 is lobed such that a counter clockwise rotation of the cable guide 16 about pivot bolt 34 will deflect the valve actuating roller 36 and increase the flow of hydraulic fluid through the control valve 18.

Figure 1:
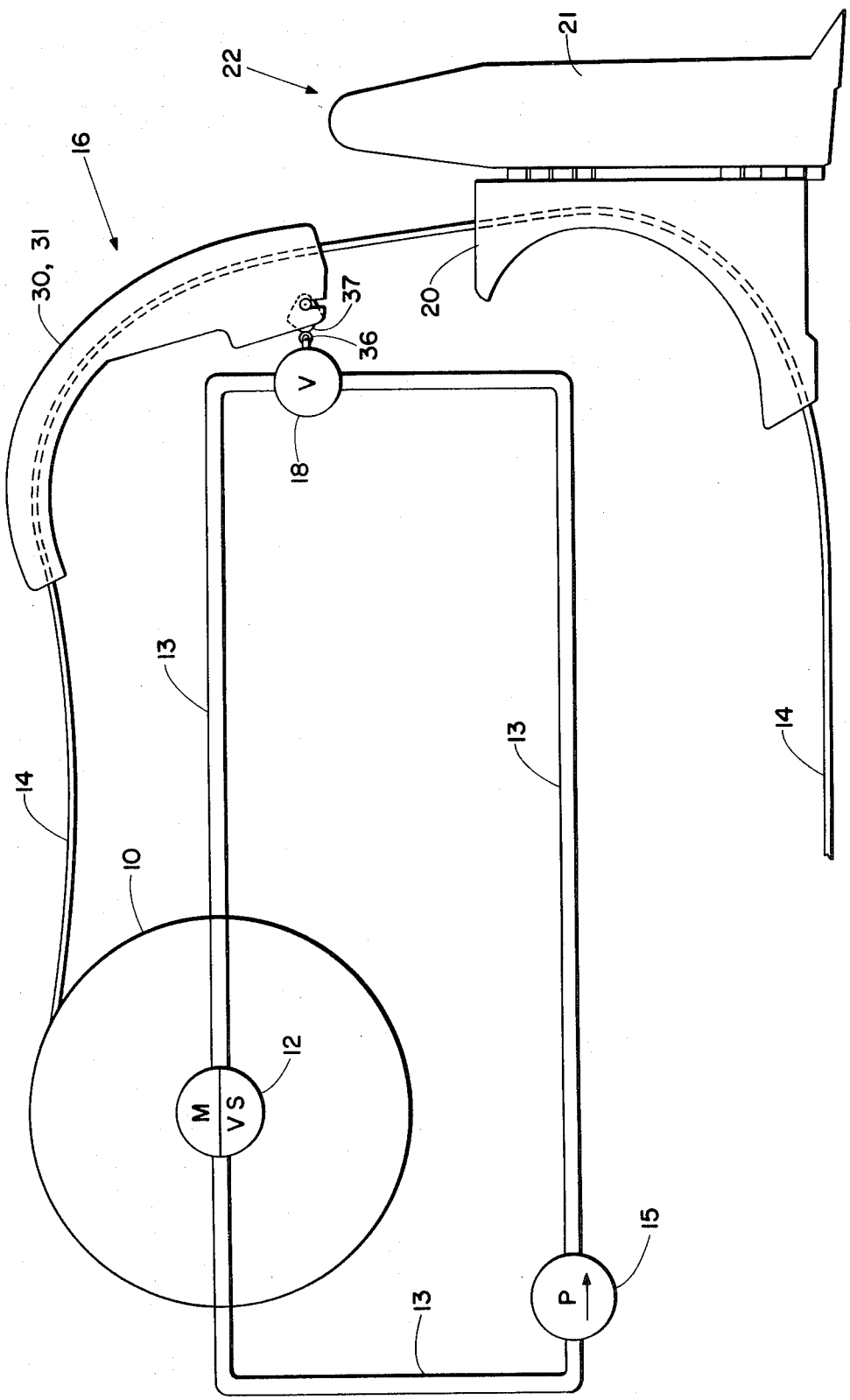
FIG. 1 is a schematic view of the system of controlling cable tension.

After passing along a smooth arc over the cable guide 16, the cable 14 passes with negligible inflection through the cable chute 20 of the cable plow 22 into the ground. When the tension in the cable 14 increases during the plowing operation, this increased tension in the portion of the cable 14 passing over the cable guide 16 will cause the cable guide 16 to deflect in a counter clockwise manner (referring to the cable guide 16 illustrated in FIG. 2). This deflection of the cable guide 16 will rotate the cam 37 so as to increase the flow of hydraulic fluid through the control valve 18. The resulting increased flow of hydraulic fluid from the pump source 15 through the control valve 18 will cause the hydraulic motor 12 to accelerate and thereby reduce the tension on the cable 14. The hydraulic motor 12 and the plow 22 are not shown in FIG. 2 but are schematically illustrated in FIG. 1.

By varying the tension in the coil spring 39 with the threaded bolt and knob combination 42 the tension in the cable 14 may be set at any desired value and may be held substantially constant at said value during the plowing operation. The tension responsive control valve 18, the hydraulic motor 12, driven cable reel 10, and the pump source 15 comprise a hydraulic control system which as described regulates the cable tension during a plowing operation over a wide range of terrain and soil conditions. The double acting shock absorber 35 serves as a damping means for the aforementioned hydraulic control system in order to control the rate of change of hydraulic fluid through the control valve 18. In this manner the drive fluid applied to the hydraulic motor 12 and hence the tension in the cable 14 will not vary erratically when the plow is being used on rough ground.

What is claimed is:

1. An apparatus for uncoiling a cable from a cable reel and feeding said cable under controlled tension into a cable chute of a cable plow comprising:

a source of pressurized fluid,
means for supporting the cable reel,
fluid driven means for rotatively driving said reel,
a pivotely mounted arcuate cable guide for supporting and for guiding the cable from the cable reel into the cable chute,
means responsive to the tension in the cable for controlling the flow of fluid from said source to the fluid driven means, said means responsive to tension in the cable having a fluid valve responsive to pivotal rotation of said cable guide under the bearing force of the cable;
said valve being adapted to increase the flow of fluid from said source to the fluid driven means so as to accelerate the cable reel in response to an increase in tension.

2. An apparatus for uncoiling cable from a cable reel and feeding said cable under controlled tension into a cable chute of a cable plow comprising:

a source of pressurized fluid,
means for supporting the cable reel,
fluid driven means for rotatively driving said reel,
a pivotely mounted arcuate cable guide for supporting and for guiding the cable from the cable reel into the cable chute, said cable guide having a supporting surface defined by a plurality of rollers arcuately distributed for supporting the cable and being tensioned so as to resiliently pivot in response to a variation in tension in the cable;
means responsive to the tension in the cable for controlling the flow of fluid from said source to the fluid driven means.

* * * * *